(12) United States Patent
Hu

(10) Patent No.: US 7,262,780 B2
(45) Date of Patent: Aug. 28, 2007

(54) SIMPLE AND ROBUST COLOR SATURATION ADJUSTMENT FOR DIGITAL IMAGES

(75) Inventor: Shane Ching-Feng Hu, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 240 days.

(21) Appl. No.: 10/922,934

(22) Filed: Aug. 23, 2004

(65) Prior Publication Data

US 2006/0038827 A1    Feb. 23, 2006

(51) Int. Cl.
G09G 5/02    (2006.01)

(52) U.S. Cl. .................................. 345/589; 345/604

(58) Field of Classification Search ............. 345/589; 382/162, 167; 358/518, 1.9, 520, 527; 348/453–457, 348/223.1, 225.1, 256, 645, 655, 690, 703, 348/FOR. 200, 202, 590–605
See application file for complete search history.

(56) References Cited

U.S. PATENT DOCUMENTS

2004/0042653 A1    3/2004    Hu

OTHER PUBLICATIONS

Alan Watt, "Fundamentals of Three Dimensional Computer Graphics," Chapter 14.4, pp. 318-322, 1989 Addison-Wesley, ISBN 0-201-154420.*

Mark D. Fairchild, "Color Appearance Models", Chapter I, Human Color Vision, pp. 3-39, 1997 Addison-Wesley, ISBN 0-201-63464-3.

Richard L. Gregory, "Eye and Brain", Chapter 7, pp. 121-135, Princeton Science Library, ISBN 0-691-04837-1, 1997.

Kobus Barnard, Vlad Cardei and Brian Funt, "A Comparison of Computational Color Constancy Algorithms; Part One", Available from http:www.cs.berkeley.edu/tilde sign kobus/research/publications/comparison_1/comparison_1.pdf, 2002.

Kobus Barnard, Lindsay Martin, Adam Coath, and Brian Funt, "A Comparison of Computational Color Constancy Algorithms; Part Two", Available from http://www.cs.berkeley.edu/tilde sign/kobus/research/publications/comparison-_2/comparison_2.pdf, 2002.

Mark D. Fairchild, "Color Appearance Models", Chapter I0, Color Appearance Models, pp. 217-230, 1997 Addison-Wesley, ISBN 0-201-63464-3.

* cited by examiner

*Primary Examiner*—Matthew C. Bella
*Assistant Examiner*—G. F Cunningham
(74) *Attorney, Agent, or Firm*—Dickstein Shapiro LLP

(57) ABSTRACT

A method and system for adjusting saturation in digital images that operates as closely as possible to the long-, medium-, short-(LMS) cone spectral response space. According to the method, a sensor component image such as an RGB image from a digital imager is input and converted to the LMS space. White point adaptation and equalization are performed on the LMS data. The saturation adjustment is then performed by applying a stretching transformation to the L and S LMS components with respect to the M component of each pixel.

40 Claims, 3 Drawing Sheets

SIMPLE AND ROBUST COLOR SATURATION ADJUSTMENT FOR DIGITAL IMAGES

BACKGROUND OF THE INVENTION

1. Field of the Invention

The present invention relates to digital image sensors, and, more specifically, to a color saturation adjustment method for image sensors and digital cameras.

2. Description of the Related Art

Saturation is an important visual aspect when viewing color images and video. When capturing color images by a digital camera, captured spectral data must be processed in order to match the original scene viewed by the human eye. Considerable saturation boost has been used to process the data to match the original scene. Saturation is the ratio of the dominant wavelength to other wavelengths in a color.

It is desirable to adjust saturation of colors in digital images without changing other important visual aspects, such as, for example, the perceived hue of the color, or the uniformity across different hues in the image.

There are several known methods and color models for adjusting saturation without disrupting other visual characteristics of a digital color image. For example, the HSV (Hue, Saturation, Value) model is a well-known color model in which the saturation attribute is independently adjustable. HLS (Hue, Lightness, Saturation) is another closely related model. While these models may be effectively utilized to adjust saturation in digital color images, the cost and complexity of adjusting saturation according to these and other known methods is substantial. For example, non-linear behavior such as perceived hue changes and non-uniformity exists when saturation is adjusted substantially. Other color models such as the 1931 standard observer model adopted by the Commission Internationale de l'Eclairage (CIE) based on a model of human rods and cones, also exhibit non-uniformity and/or non-constant hue behavior. The same is true of numerous CIE derivative models such as LUV and L*a*b.

In color television systems, "YCbCr" color difference space is used to encode color information. It also provides a convenient color space for hue and saturation adjustments. This technique, however, also suffers from the non-uniformity and hue changes when saturation is increased.

As the shortcomings of these known saturation adjustment methods demonstrate, human vision is a highly adaptive and complex system that cannot be accurately mapped to a simple and regular geometric space for all possible viewing conditions. Adapted white point and color responses will change according to the viewing conditions.

In contrast to the known electronic image sensors, the three types of color receptors in the human eye—long-, middle-, and short-wavelength cones (LMS)—have been found to exhibit significant overlap in spectral response. As a consequence of this overlapping spectral response, the hue-discrimination response of the human eye is highly non-linear, with peak sensitivity occurring near certain wavelengths. Furthermore, each LMS receptor has independent gain control.

It is desirable to have an imaging system having saturation adjustment that operates as close as possible to the LMS cone spectral response space to thereby more closely replicate human vision.

SUMMARY

Various embodiments of the present invention provide a method, apparatus, and stored program for allowing an electronic imaging system to operate as close as possible to the cone spectral response space of the human eye. The embodiments permit important visual aspects to be more closely maintained during color saturation adjustment.

According to exemplary embodiments of the invention, an input image having an imager color space, for example, a red-green-blue (RGB) color space, is transformed to an LMS color space, a color space similar to the human long-, middle-, and short-wavelength cone receptor responses. White point adaptation and equalization of the LMS components is then performed. The L (long) and S (short) components are stretched with respect to the M (middle) component of each pixel. The LMS component image is then converted back to a display device color space (e.g., an RGB image).

The invention achieves saturation adjustment while maintaining the original hue attribute, and is straightforward and relatively easy to implement.

These and other features and advantages of the invention will be better understood from the following detailed description, which is provided in connection with the accompanying drawings.

DETAILED DESCRIPTION

In the following description, an exemplary imager color space will be described as an RGB color space; however, other color imaging protocols could be used in the invention, including, for example, a subtractive CMY (cyan, magenta, yellow) color space.

Figure 1:
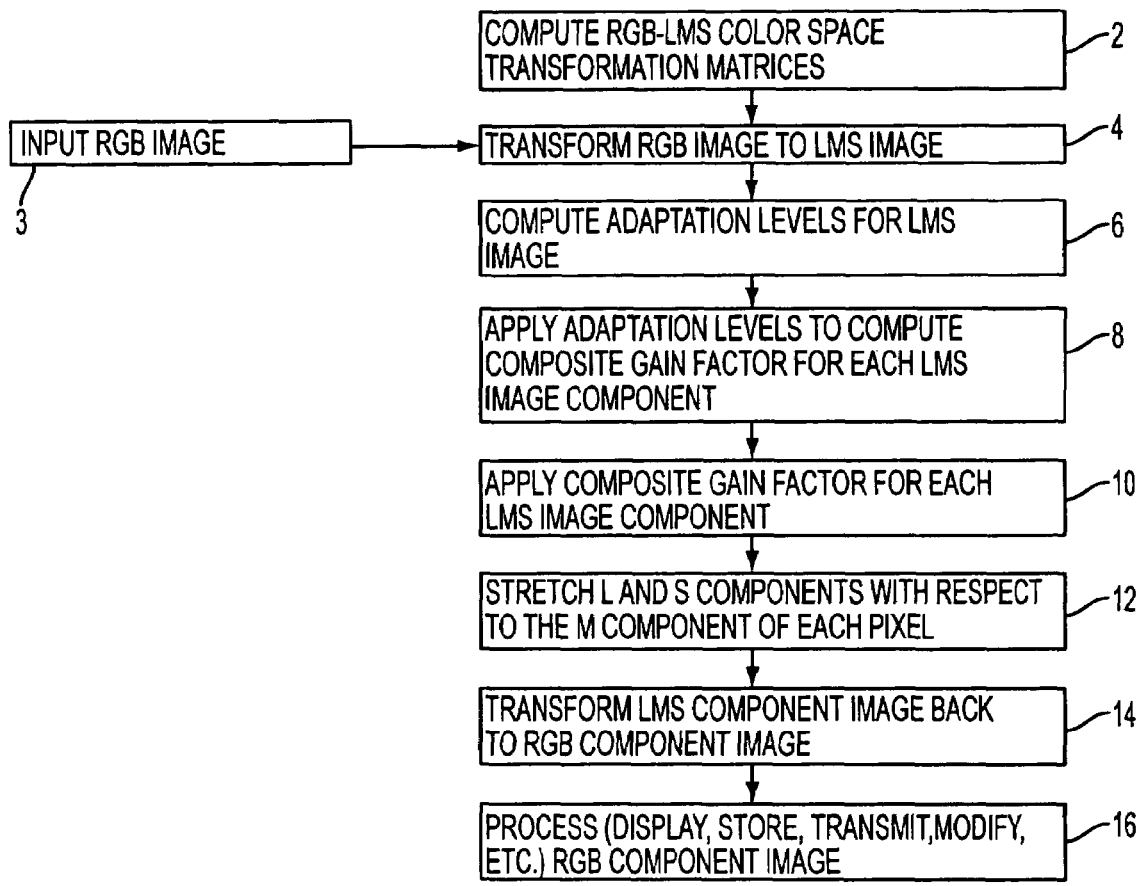
FIG. 1 is a flowchart illustrating a process for adjusting color saturation in a digital imaging system according to an exemplary embodiment of the present invention.

FIG. 1 illustrates the processing by which the saturation of image sensor data may be adjusted according to an exemplary embodiment of the invention. The method begins by converting image sensor RGB images to LMS component images. This transformation preferably includes the steps of computing RGB-LMS color space transformation matrices (step 2) and transforming an RGB component image input (step 3) to an LMS component images (step 4). These steps are described in full in U.S. patent application Ser. No. 10/228,947 to Hu (Pub. No. 2004/0042653 A1) (hereinafter the "'947 application"), which is hereby incorporated by reference in its entirety.

Next, an adaptation model is determined for each of the long (L), medium (M), and short (S) components of the LMS color space (step 6). A central issue of any adaptation model is to calculate the appropriate adaptation level for each L, M, and S component. According to an exemplary embodiment of the invention, this is accomplished by calculating a high degree geometric mean for each L, M, and S component, then determining the root mean for each component, as described in the '947 application.

At step 8, after adaptation levels are calculated for the L, M, and S components, the levels are used to compute a composite gain factor for each L, M, and S component, as described in the '947 application. The respective computed composite gain factors are applied to each L, M, S image component (step 10); this completes the adaptation and equalization of the L, M, and S components. The steps involved in the adapting and equalizing processing of the L, M, S components (i.e., steps 6-10) are also fully described in the '947 application. After equalization, the white point contains equal amount of LMS spectral response and zero saturation.

Saturation adjustment commences at step 12. According to an exemplary embodiment of the invention, both the L and S components are stretched with respect to the M component. This stretching occurs for each pixel of the LMS image (described below in more detail with respect to FIG. 2). After the stretching is performed, the LMS component image is then transformed back to an RGB component image (step 14), which may then be processed by any number of useful manipulations, such as displaying on a video array, storing, transmitting, or modifying to suit the needs of a specific application. (step 16). The transformation and processing steps 14 and 16 are also detailed in the '947 application. As such, a detailed description of these steps is not provided herein.

Figure 2:
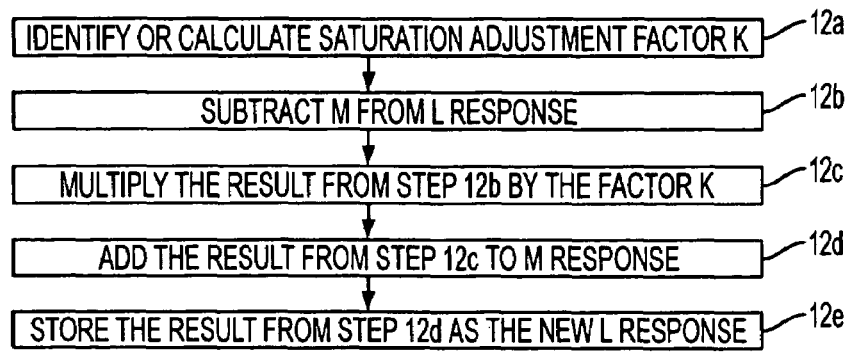
FIG. 2 is a flowchart illustrating in greater detail portions of the process illustrated in FIG. 1.

Referring now to FIG. 2, the above described step 12 of stretching the L (long) and S (short) components with respect to the M (medium) component of each pixel is described in further detail. First, at step 12a, a saturation adjustment factor K is identified or calculated. Saturation adjustment factor K is an externally settable parameter which is ideally determined such that the reproduced image appears identical to the original subject scene as observed by the human eye. It should be noted that the value of saturation adjustment factor K may vary depending on the type of imager utilized in the present invention, since different types of imagers may exhibit different spectral response and/or color separation. This further adjustment may be carried out by an external user interface function. It should also be appreciated that saturation adjustment factor K may be adjusted based on a viewer's particular preference for color saturation. For example, a viewer may set saturation adjustment factor K so that the reproduced image is not identical to the original scene as perceived by the human eye, but rather adheres to the user's particular color saturation preference.

At step 12b, the M component is subtracted from the initial L component, $L_0$. At step 12c, the result from step 12b (i.e., $L_0-M$) is multiplied by the adjustment factor K from step 12a. This product is then added to the M response component at step 12d. At step 12e, the sum from step 12d is stored as the new L response, $L_1$. The value that is ultimately stored at step 12e as $L_1$ may be represented by the equation:

$$L_1 = M + K(L_0 - M) \quad (1)$$

The same procedure may be applied to the initial S component, $S_0$, to stretch the difference between the S and M responses and calculate a new S component, $S_1$. Therefore, the S-stretching equation is:

$$S_1 = M + K(S_0 - M) \quad (2)$$

It should be noted that the adapted white point calculated and applied at steps 6-10 remains white even after these saturation transformations because there are no differences between the equalized L, M, and S responses.

As stated above, the invention provides an electronic imaging system including a saturation adjustment algorithm that provides a cost-effective human eye-like response. The above equations may be embodied in hardware, software, or a combination of the two. For example, the methods of the invention may readily be embodied as a computer program stored in a computer readable storage medium.

Figure 3:
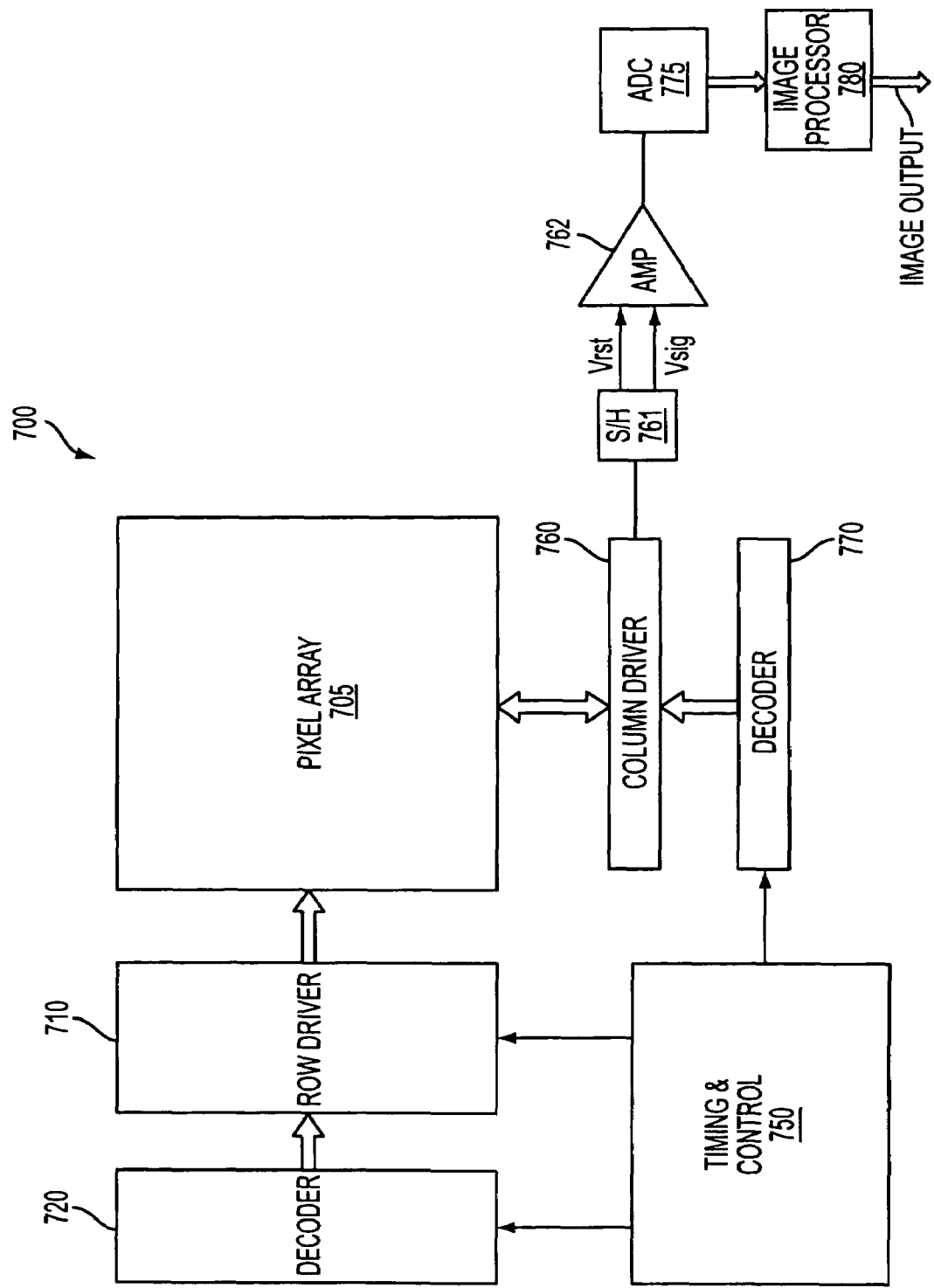
FIG. 3 is a block diagram of a CMOS imaging system.

FIG. 3 shows a block diagram of a CMOS image sensor 700. The imager 700 has a pixel array 705 comprising pixels through which images are input. Row lines are selectively activated by a row driver 710 in response to row address decoder 720. A column driver 760 and column address decoder 770 are also included in the imager 700. The imager 700 is operated by the timing and control circuit 750, which controls the address decoders 720, 770. The control circuit 750 also controls the row and column driver circuitry 710, 760.

A sample and hold circuit 761 associated with the column driver 760 reads a pixel reset signal Vrst and a pixel image signal Vsig for selected pixels. A differential signal (Vrst-Vsig) is produced by differential amplifier 762 for each pixel and is digitized by analog-to-digital converter 775 (ADC). The analog-to-digital converter 775 supplies the digitized pixel signals to an image processor 780 which forms a digital image.

According to one embodiment, image processor 780 implements the steps of the present invention described above with reference to FIG. 1 and FIG. 2, to adjust saturation in an image input through pixel array 705. Specifically, image processor 780 can execute commands to accomplish: transforming an RGB image to an LMS image; calculating white point adaptation levels for the LMS components of the LMS image and subsequently adjusting these LMS components; adjusting the saturation of the LMS space by manipulating various of the L, M, S components; and applying the new transformed L, M, S components to the LMS color space.

Figure 4:
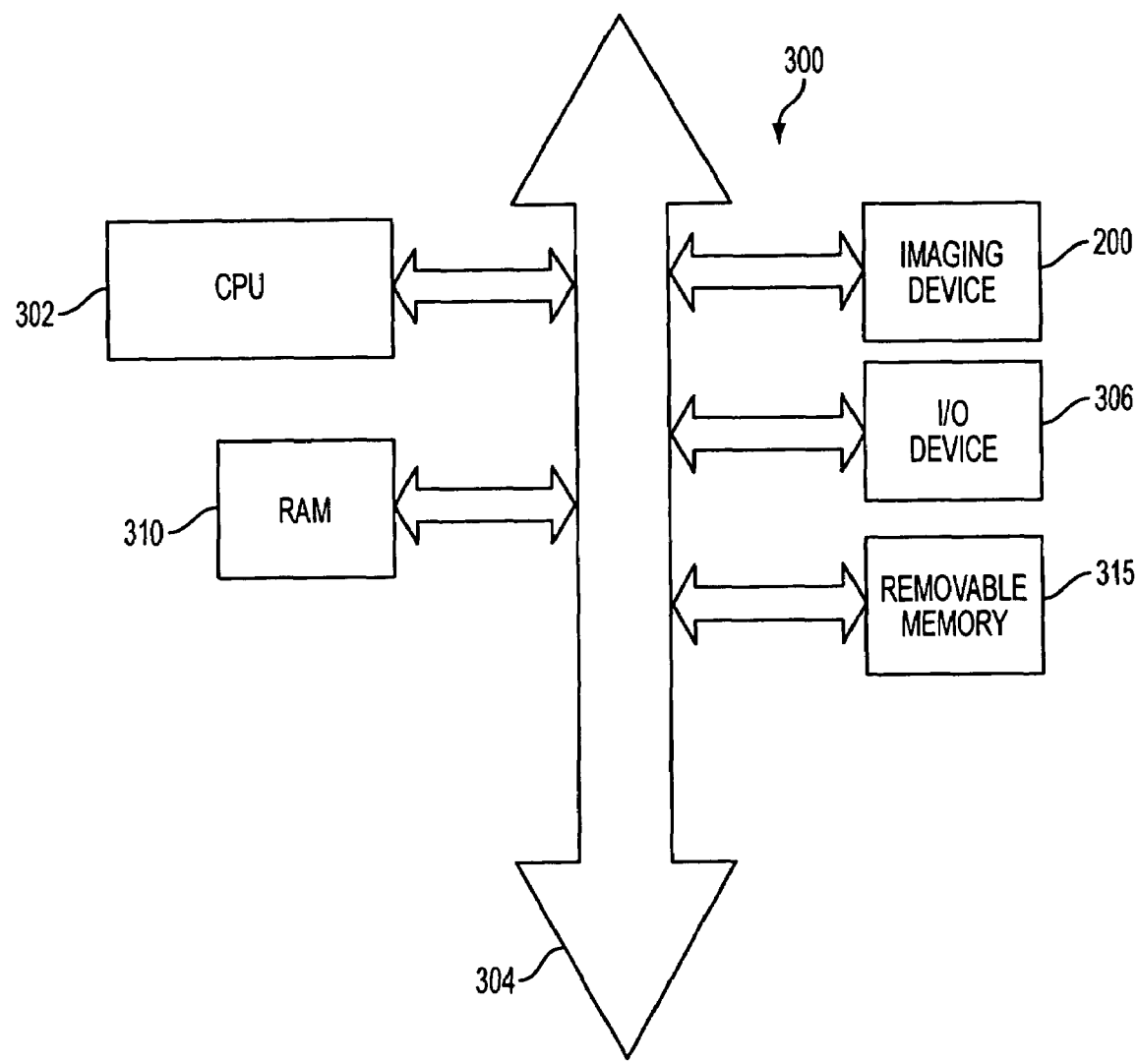
FIG. 4 illustrates a CMOS imaging system including circuitry for computing color constancy according to an exemplary embodiment of the present invention.

FIG. 4 shows system 300, a typical processor system modified to include an imager device 200 of the invention. The processor-based system 300 is exemplary of a system having digital circuits that could include image sensor devices. Without being limiting, such a system could include a computer system, camera system, scanner, machine vision, vehicle navigation, video phone, surveillance system, auto focus system, and others.

System 300, for example a camera system, generally comprises a central processing unit (CPU) 302, such as a microprocessor, that communicates with an input/output (I/O) device 306 over a bus 304. Imaging device 200 also communicates with the CPU 302 over the bus 304. The processor-based system 300 also includes random access memory (RAM) 310, and can include removable memory 315, such as flash memory, which also communicate with the CPU 302 over the bus 304. The imaging device 200 may be combined with a processor, such as a CPU, digital signal processor, or microprocessor, with or without memory storage on a single integrated circuit or on a different chip than the processor.

It should be readily recognized that the hardware components represented in FIG. 3 may implement various software commands according to the present invention. Specifically, it should be recognized that, like an image processor 780 (FIG. 3), the CPU 302 can execute commands to accomplish: transforming an RGB image to an LMS image; calculating white point adaptation levels for the LMS components of the LMS image and subsequently adjusting these LMS components; adjusting the saturation of the LMS space by manipulating various of the L, M, S components; and applying the new transformed L, M, S components to the LMS color space.

While preferred embodiments of the invention have been described and illustrated above, it should be understood that these are exemplary of the invention and are not to be considered as limiting. For example, although an exemplary embodiment has been described in connection with a CMOS image sensor, the invention is applicable to other electronic image sensors, such as CCD image sensors, for example. Furthermore, although the invention is generally described as used in a digital camera, the invention is not limited to this application. Additions, deletions, substitutions, and other modifications can be made without departing from the spirit or scope of the present invention. Accordingly, the invention is not to be considered as limited by the foregoing description but is only limited by the scope of the appended claims.

What is claimed as new and desired to be protected by Letters Patent of the United States is:

1. A method for adjusting color saturation of a digital color image comprising:
   transforming the image to an LMS color space having a plurality of long-, medium-, and short-wavelength (LMS) components;
   calculating white point adaptation levels for each of the plurality of LMS components;
   adjusting each of the plurality of LMS components based on the associated white point adaptation levels;
   adjusting the saturation of the LMS space by performing a transformation of said L components and said S components; and
   applying said transformed L components and S components to said LMS color space.

2. The method if claim 1, wherein the color image is input from an image sensor.

3. The method of claims 1, wherein the color image is input from a digital image sensor.

4. The method of claim 1, wherein the color image is input from a CMOS image sensor.

5. The method of claim 1, wherein the color image is an RGB image.

6. The method of claim 1, wherein said step of adjusting the saturation of the LMS space comprises the step of transforming said L components and said S components with respect to said M component.

7. The method of claim 6, wherein said step of transforming said L components and said S components with respect to said M component comprises identifying and applying a saturation adjustment factor K to said L components, said S components, and said M component.

8. The method of claim 7, wherein each L component is transformed according to the equation $$L_1 = M + K(L_0 - M),$$

where M is a Medium component, $L_0$ is an initial Long component, and $L_1$ is a transformed Long component.

9. The method of claim 7, wherein each S component is transformed according to the equation $$S_1 = M + K(S_0 - M),$$

where M is a Medium component, $S_0$ is an initial Short component, and $S_1$ is a transformed Short component.

10. The method of claim 1 further comprising the step of transforming said LMS color space image to an output image.

11. An imager comprising:
    means for transforming the image to an LMS color space having a plurality of long-, medium-, and short-wavelength (LMS) components;
    means for calculating white point adaptation levels for each of the plurality of LMS components;
    means for adjusting each of the plurality of LMS components based on the associated white point adaptation levels;
    means for adjusting the saturation of the LMS space by performing a transformation of said L components and said S components; and
    means for applying said transformed L components and S components to said LMS color space.

12. The imager of claim 11, wherein said means for transforming, calculating, adjusting, and applying comprises one of hardware, software, and a combination of hardware and software.

13. The imager of claim 11, wherein said means for transforming, calculating, adjusting, and applying comprises an image processor.

14. An imaging device comprising:
    a transforming unit for transforming the image to an LMS color space having a plurality of long-, medium-, and short-wavelength (LMS) components;
    a calculating unit for calculating white point adaptation levels for each of the plurality of LMS components;
    an adjusting unit for adjusting each of the plurality of LMS components based on the associated white point adaptation levels;
    a second adjusting unit for adjusting the saturation of the LMS space by performing a transformation of said L components and said S components; and
    an applying unit for applying said transformed L components and S components to said LMS color space.

15. The imaging device of claim 14, further comprising a display device having a screen, and circuitry for displaying an RGB component image on said screen.

16. The imaging device of claim 14, wherein the color image is input from an image sensor.

17. The imaging device of claim 14, wherein the color image is input from a digital image sensor.

18. The imaging device of claim 14, wherein the color image is input from a CMOS image sensor.

19. The imaging device of claim 14, wherein the color image is an RGB image.

20. The imaging device of claim 14, wherein said step of adjusting the saturation of the LMS space comprises the step of transforming said L components and said S components with respect to said M component.

21. The imaging device of claim 20, wherein said step of transforming said L components and said S components with respect to said M component comprises identifying and applying a saturation adjustment factor K to said L components, said S components, and said M component.

22. The imaging device of claim 21, wherein each L components is transformed according to the equation $$L_1 = M + K(L_0 - M),$$

where M is a Medium component, $L_0$ is an initial Long component, and $L_1$ is a transformed Long component.

23. The imaging device of claim 21, wherein each S component is transformed according to the equation $$S_1 = M + K(S_0 - M),$$

where M is a Medium component, $S_0$ is an initial Short component, and $S_1$ is a transformed Short component.

24. A storage medium containing a program for adjusting the color saturation of a digital color image, the program comprising instructions for transforming the image to an LMS color space having a plurality of long-, medium-, and short-wavelength (LMS) components; calculating white point adaptation levels for each of the plurality of LMS components; adjusting each of the plurality of LMS components based on the associated white point adaptation levels; adjusting the saturation of the LMS space by performing a transformation of said L components and said S components; and applying said transformed L components and S components to said LMS color space.

25. The storage medium of claim 24, wherein the color image is input from an image sensor.

26. The storage medium of claim 24, wherein the color image is input from a digital image sensor.

27. The storage medium of claim 24, wherein the color image is input from a CMOS image sensor.

28. The storage medium of claim 24, wherein the color image is an RGB image.

29. The storage medium of claim 24, wherein said step of adjusting the saturation of the LMS space comprises the step of transforming both said L components and said S components with respect to said M component.

30. The storage medium of claim 29, wherein said step of transforming both said L components and said S components with respect to said M component comprises identifying and applying a saturation adjustment factor K to said L components, said S components, and said M component.

31. The storage medium of claim 30, wherein each L component is transformed according to the equation $$L_1 = M + K(L_0 - M),$$

where M is a Medium component, $L_0$ is an initial Long component, and $L_1$ is a transformed Long component.

32. The storage medium of claim 30, wherein each S component is transformed according to the equation $$S_1 = M + K(S_0 - M),$$

where M is a Medium component, $S_0$ is an initial Short component, and $S_1$ is a transformed Short component.

33. A method for adjusting the saturation of an LMS component image having a plurality of long-, medium-, and short wavelength components comprising using a processor for stretching said Long components and said Short components with respect to said Medium component.

34. The method of claim 33, wherein said stretching said Long components and said Short components with respect to said Medium component comprises identifying and applying a saturation adjustment factor K to said Long components, said Short components, and said Medium component.

35. The method of claim 34, wherein each Long component is stretched according to the equation $$L_1 = M + K(L_0 - M),$$

where M is a medium component, $L_0$ is an initial Long component, and $L_1$ is a transformed Long component.

36. The method of claim 34, wherein each Short component is stretched according to the equation $$S_1 = M + K(S_0 - M),$$

where M is a medium component, $S_0$ is an initial Short component, and $S_1$ is a transformed Short component.

37. An imager comprising a processor for adjusting the saturation of an LMS component image having a plurality of long-, medium-, and short-wavelength components to stretch said Long components and said Short components with respect to said Medium component.

38. The imager of claim 37, wherein said of stretching said Long components and said Short components with respect to said Medium component comprises identifying and applying a saturation adjustment factor K to said Long components, said Short components, and said Medium component.

39. The imager of claim 38, wherein each Long component is stretched according to the equation $$L_1 = M + K(L_0 - M),$$

where M is a medium component, $L_0$ is an initial Long component, and $L_1$ is a transformed Long component.

40. The imager of claim 38, wherein each Short component is stretched according to the equation $$S_1 = M + K(S_0 - M),$$

where M is a medium component, $S_0$ is an initial Short component, and $S_1$ is a transformed Short component.

* * * * *

UNITED STATES PATENT AND TRADEMARK OFFICE
CERTIFICATE OF CORRECTION

PATENT NO. : 7,262,780 B2  Page 1 of 1
APPLICATION NO. : 10/922934
DATED : August 28, 2007
INVENTOR(S) : Hu It is certified that error appears in the above-identified patent and that said Letters Patent is hereby corrected as shown below:

On the Title Page Item (56), under "Other Publications", line 13, delete "comparison-_2" and insert -- comparison_2 --, therefor.

On the Title Page Item (56), under "Other Publications", line 14, delete "I0" and insert -- 10 --, therefor.

On the Title Page Item (57), under "Abstract", line 3, delete "short-(LMS)" and insert -- short- (LMS) --, therefor.

In column 5, line 35 (Approx.), in Claim 2, after "method" delete "if" and insert -- of --, therefor.

In column 7, line 43 (Approx.), in Claim 33, delete "short" and insert -- short- --, therefor.

Signed and Sealed this

Thirteenth Day of November, 2007

JON W. DUDAS
*Director of the United States Patent and Trademark Office*